United States Patent [19]

Dean

[11] 4,262,868
[45] Apr. 21, 1981

[54] THREE-POSITION VARIABLE CAMBER FLAP

[75] Inventor: Roy D. Dean, Seattle, Wash.

[73] Assignee: The Boeing Company, Seattle, Wash.

[21] Appl. No.: 43,415

[22] Filed: May 29, 1979

[51] Int. Cl.² ............................................. B64C 3/50
[52] U.S. Cl. ............................... 244/214; 244/219
[58] Field of Search ........................ 244/210, 214, 219

[56] References Cited

U.S. PATENT DOCUMENTS

| | | | |
|---|---|---|---|
| 3,504,870 | 4/1970 | Cole et al. | 244/214 |
| 3,743,219 | 7/1973 | Gorges | 244/210 |
| 3,910,530 | 10/1975 | James et al. | 244/214 |
| 4,159,089 | 6/1979 | Cole | 244/214 |

*Primary Examiner*—Charles E. Frankfort
*Attorney, Agent, or Firm*—H. Gus Hartmann; Bernard A. Donahue

[57] ABSTRACT

A wing leading edge variable camber flap for an airplane, the flap having a pivoted bullnose and flap extension and retraction linkage mechanism for sequencing the flap into three positions of operation: a stowed position for high speed cruise operation of the airplane; a first forwardly and downwardly extended flap position whereat an aerodynamic slot is formed between the trailing edge of the flap and the relatively fixed leading edge of the wing, coupled with a steep flap angle-of-deflection of the flap relative to the wing chord plane, for low speed landing operation of the airplane; and a further forwardly extended second position whereat the trailing edge of the flap is moved to an abutment relation with the leading edge of the wing to seal off the aerodynamic slot, to form a substantially aerodynamically continuous upper surface and the flap angle-of-deflection being less than the landing position, for creating less drag during take-off operation of the airplane.

4 Claims, 4 Drawing Figures

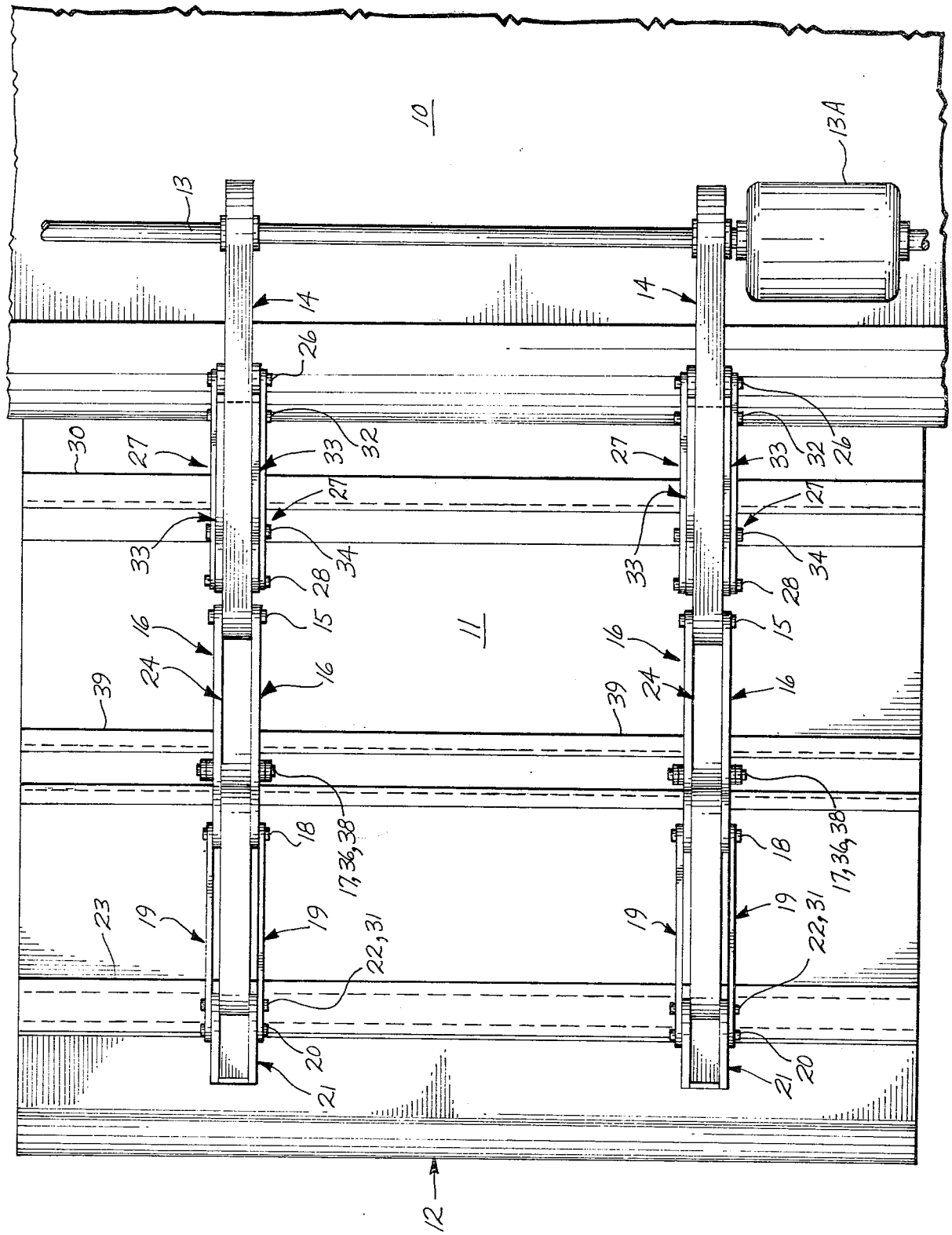

THREE-POSITION VARIABLE CAMBER FLAP

SUMMARY OF THE INVENTION

The invention is directed to a three-position, wing leading edge, variable camber flap. In order to meet specific aerodynamic requirements of new high speed wing designs, it is necessary that the flap produce good lift-coefficients for landing and take-off operation. This necessitates the requirement that the flap have the following operating positions; a first, a stowed position for high speed cruise operation of the airplane; second, a forward extended position of the flap at which the trailing edge of the flap forms an aerodynamic slot with the wing leading edge for landing operation of the airplane; and third, a further forward extended position at which the aerodynamic slot is closed-off and the flap angle-of-deflection decreased, for take-off operation of the airplane.

A known variable camber flap is shown in U.S. Pat. No. 3,504,870 issued to Cole et al on Apr. 7, 1970 and this flap uses a double four-bar linkage arrangement.

The present invention incorporates a slightly different kinematic linkage geometry, than the double four-bar linkage arrangement shown in Cole et al, to accomplish two forward extended flap operating positions and a retracted or stowed flap position. The Cole et al flap has only one forward extended operating position; whereas, the flap of the present invention has a linkage mechanism which programs the variable camber flap into two forward extended operating positions. Further, the invention is primarily directed to the trailing edge attach point of the extended flap panel and the linkage mechanism interconnecting the flap trailing edge to the relatively fixed wing leading edge structure, so that the linkage mechanism pulls the flap trailing edge against the wing leading edge to seal off an aerodynamic slot during actuation of the flap to take-off operating position, without changing the camber on the airfoil cross-section of the flap.

An object of the invention is to provide a variable camber flap, for the leading edge of a wing, that can be utilized on a high speed wing airfoil section design and yet produce good lift-coefficients during landing operation of the airplane coupled with improved take-off operation drag characteristics.

Another object is to provide a three-position, wing leading edge flap, i.e.: a closed or stowed position of the flap within the leading edge undersurface portion of the wing, for high speed cruise operation of the airplane; a first forward extended operating position whereat the flap is at a predetermined downward angle-of-deflection, relative to a wing chordplane, and forms an aerodynamic slot with the wing leading edge; and a second further forward extended operating position whereat the flap is at a lesser downward angle-of-detection than said first extended position and the aerodynamic slot is closed-off.

Another object is to produce a dwell situation in the flap cambering linkage mechanism so that the flap camber remains essentially the same at each of two forward extended operating positions of the flap.

An object is to have a tightly closed linkage arrangement so that at all times the flap linkage mechanism is under positive control.

BRIEF DESCRIPTION OF THE DRAWINGS

FIG. 3 is a view similar to the preceding views of FIGS. 1 and 2, showing the variable camber flap at a further forward extended second position, whereat the aerodynamic slot depicted in FIG. 2 is closed-off and the trailing edge of the flap is in an abutment relationship with the leading edge of the wing.

FIG. 4 is a bottom plan view of a spanwise segment of the variable camber flap, taken in the direction 4—4 as indicated on FIG. 3 for showing two spanwise sets of linkage mechanisms which are arranged and actuated in a chordwise plane by an interconnecting torque shaft and a rotary drive motor arrangement.

DESCRIPTION OF THE PREFERRED EMBODIMENTS

The invention is directed to a three-position, wing leading edge, variable camber flap having a flexible panel and pivoted bullnose.

Figure 1:
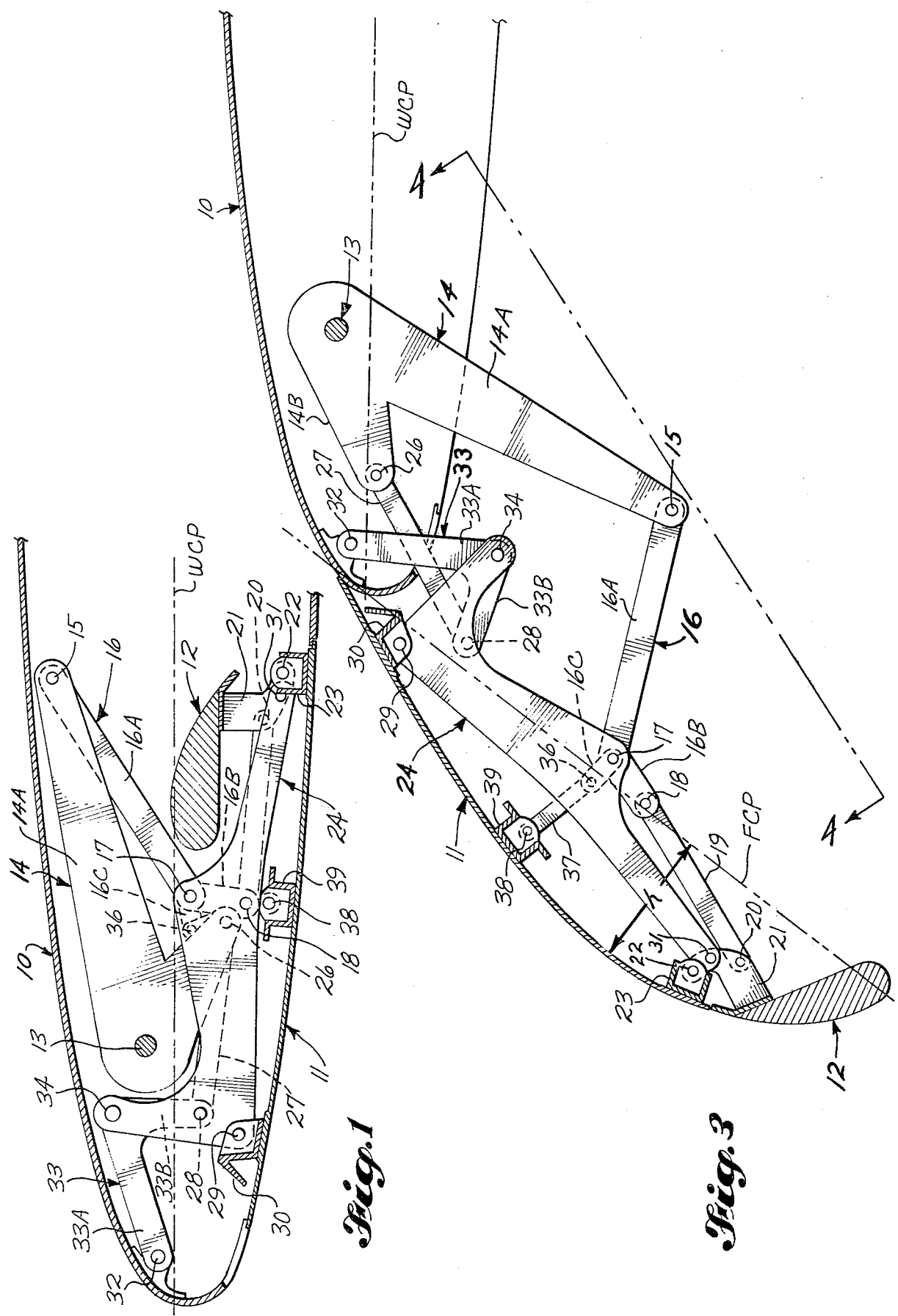
FIG. 1 is a cross-sectional view taken in a chordwise direction, of a variable camber leading edge flap in a stowed position whereat a flexible flap panel completes the undersurface contour of the wing airfoil section.

FIG. 1 shows the variable camber flap in its fully retracted first position; whereat, it is completely stowed within the undersurface of the wing and completes the undersurface contour of the wing airfoil envelope for high speed cruise.

Figure 2:
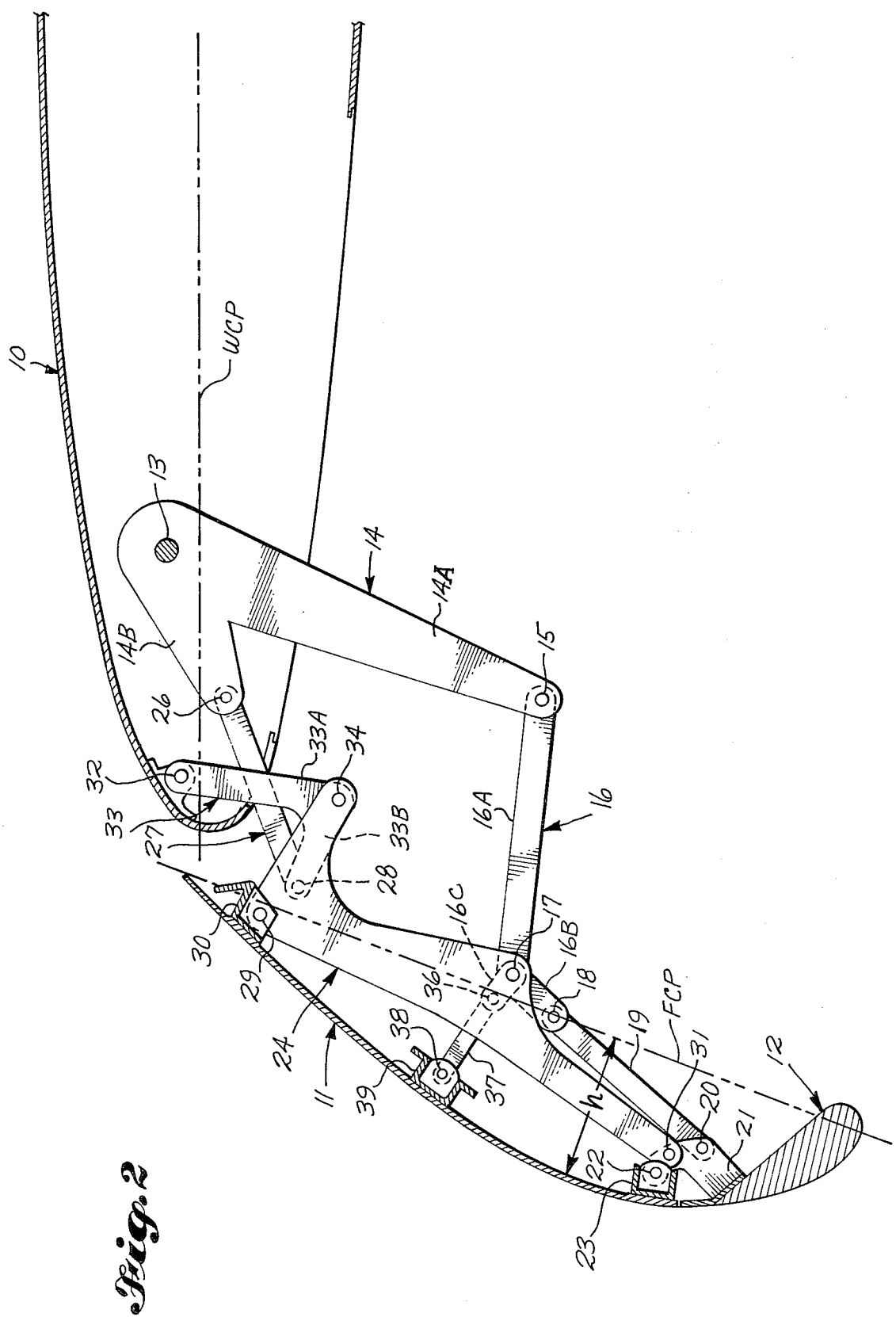
FIG. 2 is a cross-sectional view similar to FIG. 1 with the variable camber flap extended from the stowed position beneath the wing to a first extended operating position in front of the wing, whereat an aerodynamic slot is formed between the trailing edge of the flap and the leading edge of the wing.

FIG. 2 shows the variable camber flap extended from the stowed position of FIG. 1 to an extended operating second position which is forward and downward from the relatively fixed leading edge of the wing; and whereat, an aerodynamic slot is formed between the trailing edge of the flap and the leading edge of the wing, coupled with a relatively steep flap angle-of-deflection relative to the wing chord plane (WCP), for low speed flight during landing operation.

FIG. 3 shows the variable camber flap at a further forward extended operating third position; whereat, the aerodynamic slot is closed off and the flap chord plane (FCP) is at a lesser angle-of-deflection, than said second position, for decreased drag during takeoff operation.

Referring to FIGS. 2–3, mounted to wing structure 10 for rotation in a chordal plane about a spanwise axis 13, is a drive bellcrank 14 having drive arms 14A and 14B. Drive bellcrank 14 is rotatably driven about axis 13 by means such as a power hinge or rotary actuator 13A shown in FIG. 4. The lower end of bellcrank drive arm 14A is connected at 15 to a Y-bellcrank 16 having arms 16A, 16B and 16C. Y-bellcrank 16 is pivotally mounted at 17 to approximately the mid-length to a flap chord beam 24. The upper end of flap chord beam 24 is supportably suspended from wing leading edge structure through a support bellcrank 33 having arms 33A and 33B. Support bellcrank 33 is pivotally mounted at 34 to the flap chord beam 24; and through arm 33A, the support bellcrank 33 is connected at 32 to wing leading edge structure. Support bellcrank arm 33B is connected at 28 to one end of link 27 and the other end of link 27 is connected at 26 to bellcrank drive arm 14B. The geometric arrangement of support bellcrank 33, link 27 and drive bellcrank arm 14B, is such that the change in flap angle-of-deflection between the two forward operating positions shown in FIGS. 2-3, takes place as though point 34 was approximately the pivotal axis for the flap. This is due to a dwell condition in the rotational movement of support bellcrank 33 about pivot 32, caused by the alignment of link 27 with the drive bellcrank arm 14B, or the aligning of points 13, 26, 28, between these two extended operating positions of the flap. With point 34 being held substantially fixed in space, the drive bellcrank arm 14A and Y-bellcrank arm 16A will rotate the flap through a change in angle-of-deflection between FIGS. 2 and 3. Also, between these two forward operating positions of the flap, both the flexture, or curvature of the flap panel 11 as indicated by the dimension "h" taken normal to the flap chord plane (FCP), and the rotational position of the bullnose 12 with respect to the flap chord beam 24, will remain substantially the same. This will be more clearly understood from the following detailed description of the linkage geometry and arrangement of the flap panel 11 and bullnose 12. The flap panel 11 is constructed as a glass fiber composite in order that there is less chance of failure due to flexing or bending; also, there is a variation of thickness to permit the forward lower portion of the panel, between spanwise stringers 23 and 39, to curve more than the upper aft portion of the panel between stringers 39 and 30.

The flap panel 11 is integrally fastened to a series of spanwise stiffeners or stringers 30, 39, 23 and through these stringers, is mounted to the flap chord beam 24. At the upper end or trailing edge of the flap panel 11, the stringer 30 is connected at 29 to the upper or aft-end of the flap chord beam 24. The mid-portion of the flap panel 11, through stringer 39, is connected at 38 to one end of link 37 and the other end of link 37 is connected at 36 to Y-bellcrank arm 16C. The Y-bellcrank 16 is pivoted at 17 to the mid-length of flap chord beam 24. The lower forward end or leading edge of the flap panel 11, through stringer 23, is connected at 22 to an extension of bullnose arm 21 which is integrally fastened to the bullnose 12. The bullnose 12, through arm 21, is mounted for rotation about point 31 and is moved relative to the flap chord beam 24 by link 19 and Y-bellcrank arm 16B. The bullnose 12 is rotated simultaneously with the flexible panel 11: from the stowed position in the wing undersurface shown in FIG. 1 whereat the flexible panel completes the undersurface contour of the wing airfoil section and the bullnose 12 in its stowed position is pivotally folded back onto the flexible panel 11; to a forward rotated first operative position shown in FIG. 2 whereat the trailing edge of the flexible panel 11 forms and aerodynamic slot with the leading edge of the wing and the bullnose 12 is rotated relative to the flexible panel so that it forms a rounded leading edge for the extended variable camber flap. In order to meet specific aerodynamic requirements, it is necessary that the variable camber flap have a further forward extended second operative position shown in FIG. 3 whereat the trailing edge of the flap forms an abutment relationship with the leading edge of the wing to seal off the aerodynamic slot for decreased drag during takeoff operation of the airplane.

Referring to FIGS. 2-3, it will be noted that the camber of the flap airfoil section, indicated by dimension "h" normal to FCP (flap chord plane), is maintained substantially constant during movement of the flap from the take-off position shown in FIG. 2 to the landing position shown in FIG. 3; and this is accomplished through the design of the dwell condition in the flap cambering linkage. The curvature or flexture of the flap panel 11 is indicated by the maximum height or "h" dimension above the FCP (flap chord plane) and it remains substantially the same between these two positions due to the alignment of link 37 and Y-bellcrank arm 16C or the substantial aligning of points 38, 36, 17. Also, rotation of the bullnose 12, relative to flap chord beam 24, about pivot 31 remains substantially stationary due to the dwell condition of link 19 and Y-bellcrank arm 16B or the substantial alignment of points 20, 18 and 17. The bullnose 12 does not begin to rotate relative to the flap chord beam 24 for folding back toward the inner surface of the flap panel 11, until the entire flap has been rotated well past the angle-of-deflection of the landing position shown in FIG. 2, toward the stowed position shown in FIG. 1; and then, the bullnose 12 begins to fold back over onto the backside of the flap panel 11 and out of the way, so that the flap panel 11 can be inserted into the opening formed in the lower skin of the wing to complete the undersurface contour in the stowed position shown in FIG. 1. Therefore, the entire wing leading edge variable camber flap moves through an angle-of-deflection, between the landing and take-off positions, with practically no motion of the linkage that programs flexing of the flap panel 11 or rotation of bullnose 12 relative to flap chord beam 24, in order that the flap camber, flap chord length and overall cross-sectional airfoil shape of the flap remains substantially constant at and between these two positions, with the only difference being that flap trailing edge forms an aerodynamic slot with the wing leading edge for the landing position shown in FIG. 2 and for the take-off, flap angle-of-deflection position shown in FIG. 3, the trailing edge of the flap is pressed tightly down against the nose of the wing leading edge to form a substantially air sealed relationship therewith.

In considering the amount of aerodynamic drag created by the flap when it is in the landing position shown in FIG. 2, it would not be critical if this position of the flap were to be used for take-off operation of present known four-engined airplanes; because, the newer high bypass ratio turbofan engines used on today's commercial airline passenger airplane, produce sufficient thrust to meet the rapid acceleration requirements for safely taking off from runaway lengths of most of the major airports. However, with respect to an engine-out condition during take-off operation of an airplane having two engines instead of four, with the thrust from one engine lost, one-half of the take-off thrust causes flap aerodynamic drag to become a critical factor; whereas, with the loss of power from one engine of a four-engined airplane, only one-fourth of the take-off thrust would be lost and generally this would not be as critical from the standpoint of aerodynamic drag.

Further, in considering the aerodynamic drag characteristics of the flap for the landing operation of an airplane, it is generally desirable to create a little drag during the let-down and landing approach. Therefore, for the higher wing angle-of-attack and nose up attitude of the airplane during the slow speed approach, let-down and landing, the greater flap angle-of-deflection position with the aerodynamic slot shown in FIG. 2, in combination with an aft extended and downward deflected trailing edge flap, is more desirable.

While the invention has been disclosed with reference to a preferred embodiment, it is to be understood that those modifications and changes which become obvious to a person skilled in the art to which this invention pertains, as a result of the teachings hereof, are considered to be encompassed by the following claims.

I claim:

1. A linkage mechanism for extending a flap from a stowed position within the undersurface of an airfoil to a forward and downward extended operating position, comprising: a first support arm mounted to a trailing edge portion of said flap and connected to fixed structure at the leading edge portion of the airfoil; a first drive arm mounted to fixed structure of the airfoil, aft of said first support arm, for rotation in a chordwise plane; a drive link connected at one end to said first drive arm and connected at the other end to a mid-section of the flap; a second drive arm mounted co-axially with said first drive arm and rotatable therewith; a second support arm mounted co-axially with said first support arm and rotatable therewith; and a support link interconnecting said second drive arm with said second support arm.

2. A linkage mechanism for extending a flap from a stowed position within the undersurface of an airfoil to a first forward and downward extended operating position forming an aerodynamic slot with the leading edge of the airfoil, and a second extended operating position whereat the aerodynamic slot is closed off, comprising: said flap being supported from the leading edge portion of the airfoil at the first forward and downward extended operative position, a drive bellcrank having a first and a second drive arm, and being pivotally mounted to fixed structure of the airfoil for rotation in a chordwise plane; a flap support bellcrank being fulcrumed to an upper end of said flap and having a first arm pivotally connected to fixed structure of the airfoil at a point spaced forward of said drive arm pivotal mounting; a flap support interconnect link pivotally connected at one end to a second arm of said flap support bellcrank and pivotally connected at the other end to said second drive arm of the drive bellcrank; a drive inter-connect link extending chordwise fore and aft, and being pivotally connected at its aft end to a lower portion of said first drive arm and pivotally connected at its forward end to an intermediate portion of the flap; said flap support inter-connect link and said second drive arm being in a kinematic dwell relationship between said two forward and downward extended operating positions of the flap for providing a substantially fixed in space hinge axis for said flap, approximately at said flap support bellcrank fulcrum, to permit closure of the aerodynamic slot during movement of the flap from its first extended operating position to the second operating position.

3. A variable camber flap having a linkage mechanism arranged and actuated in a chordwise plane for extending the flap to two forward operative positions from a stowed position within the undersurface of an airfoil, comprising: said flap having a flap chord beam and being supported at a first forward and downward operative position forming an aerodynamic slot with the leading edge of the airfoil; a first support arm pivotally mounted to an upper end of said flap chord beam and pivotally connected to fixed structure at the leading edge portion of the airfoil; a first drive arm pivotally mounted to fixed structure of the airfoil, aft of said first support arm, for rotation in a chordwise plane; a drive link pivotally connected at one end to said first drive arm and pivotally connected at the other end to a mid-section of the flap; a second drive arm mounted co-axially with said first drive arm and rotatable therewith; a second support arm mounted co-axially with said first support arm and rotatable therewith: a support link interconnecting said second drive arm with said second support arm; a panel supported from said flap chord beam and forming the upper surface contour of said flap; a bullnose mounted to a lower end of said flap chord beam and forming in combination with said panel, the leading edge of said flap; and said support link and said second drive arm, remaining substantially in a kinematic dwell relationship for providing a substantially fixed in space hinge axis for said flap, approximately at said pivotal mounting of said first support arm to the upper end of said flap chord beam, to permit closure of the aerodynamic slot during movement of the flap from its first extended operating position to the second forward operating position.

4. A variable camber flap having a linkage mechanism arranged and actuated in a chordwise plane for extending the flap to two forward angle-of-deflection operative positions from a stowed position within the undersurface of an airfoil, comprising: said flap having a flap chord beam and being supported at a first forward and downward angle-of-deflection operative position forming an aerodynamic slot with the leading edge of the airfoil; a support bellcrank having first and second support arms and being fulcrumed to an upper end of said flap chord beam; said first support arm being pivotally connected to fixed structure at the leading edge portion of the airfoil; a drive bellcrank having first and second drive arms and being fulcrumed to fixed structure of the airfoil, chordwise aft of said flap support bellcrank, for rotation in a chordwise plane; a Y-bellcrank having first, second and third arms, and being fulcrumed at the intersection of its three arms to an intermediate chordwise section of said flap chord beam; said Y-bellcrank first arm extending chordwise aft, from said flap chord beam fulcrum connection, and being pivotally connected to said first drive arm; a support link interconnecting said second support arm with said second drive arm; a panel forming the upper surface contour of the flap and being supported chordwise at a leading, an intermediate and a trailing edge portion, from said flap chord beam; a flap nose structure pivotally mounted to a lower end of said flap chord beam and forming in combination with said panel, the leading edge contour for said flap; said Y-bellcrank second arm being connected to said flap nose structure for moving said flap nose structure relative to said panel; said Y-bellcrank third arm being connected chordwise to an intermediate section of said panel for controllably bending said panel to vary the camber of the flap; said Y-bellcrank second and third arms, and their interconnecting relationship with said flap nose structure and said panel respectively, being such as to substantially produce the same flap camber at each of said two forward angle-of-deflection operative positions; and said flap support link and said second drive arm remaining substantially in a kinematic dwell relationship between said two forward positions of the flap for providing a substantially fixed in space hinge axis for said flap, approximately at said flap support bellcrank fulcrum, to permit closure of the aerodynamic slot during change in angle-of-deflection movement of the flap from said first extended operative position to said second operative position.

* * * * *